United States Patent
Ho et al.

(10) Patent No.: US 7,517,918 B2
(45) Date of Patent: Apr. 14, 2009

(54) UV CURABLE PAINT COMPOSITION, METHOD FOR USING THE SAME AND RELATED COATING STRUCTURE

(75) Inventors: Chi-Chuang Ho, Tu-Cheng (TW); Chuan-De Huang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 183 days.

(21) Appl. No.: 11/506,992

(22) Filed: Aug. 18, 2006

(65) Prior Publication Data

US 2007/0106003 A1  May 10, 2007

(30) Foreign Application Priority Data

Nov. 4, 2005  (CN)  .................. 2005 1 0101039

(51) Int. Cl.
  *C08J 3/28* (2006.01)
  *C03C 25/10* (2006.01)
  *C08G 63/91* (2006.01)
  *C08F 283/12* (2006.01)

(52) U.S. Cl. .................. 522/148; 522/172; 525/418; 525/479

(58) Field of Classification Search .................. 522/99, 522/148, 170, 172; 525/418, 479
See application file for complete search history.

(56) References Cited

U.S. PATENT DOCUMENTS

| | | | |
|---|---|---|---|
| 4,416,750 A * | 11/1983 | Murphy et al. | ................. 522/92 |
| 6,641,805 B1 * | 11/2003 | Morita et al. | ............ 424/78.03 |
| 6,991,833 B2 | 1/2006 | Khron | |
| 2003/0176584 A1 * | 9/2003 | Maruyama et al. | ....... 525/326.6 |
| 2005/0080157 A1 * | 4/2005 | Wagener et al. | ............. 523/122 |

FOREIGN PATENT DOCUMENTS

JP  2001288216 A  * 10/2001

OTHER PUBLICATIONS

Dieter Stoye and Werner Freitage, Paints, Coatings & Solvents, 1998, Wiley-VCH, Ed. 2, pp. 136-137.*
English Language Machine Translation of JP 2001-288216, Oct. 2001.*

* cited by examiner

*Primary Examiner*—Sanza L McClendon
*Assistant Examiner*—Jessica Treidl
(74) *Attorney, Agent, or Firm*—Andrew C. Cheng

(57) ABSTRACT

The present invention relates generally to a UV curable paint composition, a method for using the same and a coating composition made from the same. According to one embodiment, the paint composition includes a silicone modified aliphatic acrylated oligomer having fluorine substituted side chains in an amount by weight from 5% to 25%, an alkyl acrylate monomer in an amount by weight from 5% to 25%; a photoinitiator in an amount by weight from 0.1% to 5%; a plurality of pigment particles in an amount by weight from 0.1% to 5%; a nano-silver solution in a amount by weight from 0.1% to 5%; with remainder being solvent.

14 Claims, 1 Drawing Sheet

UV CURABLE PAINT COMPOSITION, METHOD FOR USING THE SAME AND RELATED COATING STRUCTURE

BACKGROUND

1. Technical Field

The invention relates generally to a UV curable paint composition, a method of using the UV curable paint composition and related coating structure.

2. Discussion of Related Art

Coatings are widely used in vehicles, furniture and electrical appliances both for the protection and decoration of the corresponding substrate. Typically, a paint coating is comprised of a primer coating and a top lacquer coating. The primer coating is directly attached onto a surface of a substrate to be coated, and provides color whilst sealing the substrate and enhancing the adhesion between the substrate and the lacquer coating. The lacquer coating is usually a transparent natural coating or a metallic coating, which matches with the primer coating to give the whole paint coating an attractive high gloss.

As these coatings are often used in objects which regularly come into contact with objects such as portable electrical appliances which may often come into contact with dirt the surface of the coating can be polluted easily and loses its attractive high gloss. Also bacterial pathogens may contaminate the coating and lead to the spread of infection.

Therefore, a heretofore-unaddressed need exists in the industry to address the aforementioned deficiencies and inadequacies.

SUMMARY

In one embodiment, a UV curable paint composition includes: a silicone modified aliphatic acrylated oligomer having fluorine substituted side chains in an amount by weight from 5% to 25%; an alkyl acrylate monomer in an amount by weight from 5% to 25%; a photoinitiator in an amount by weight from 0.1% to 5%; a number of pigment particles in an amount by weight from 0.1% to 5%; a nano-silver solution in an amount by weight from 0.1% to 5%; with remainder being a solvent.

In another embodiment, a method for using a UV curable paint includes the steps of: providing an UV curable paint which has the composition of: a silicone modified aliphatic acrylated oligomer having fluorine substituted side chains in an amount by weight from 5% to 25%; an alkyl acrylate monomer in an amount by weight from 5% to 25%; a photoinitiator in an amount by weight from 0.1% to 5%; a plurality of pigment particles in an amount by weight from 0.1% to 5%; a nano-silver solution in an amount by weight from 0.1% to 5%; with remainder being a solvent; applying the UV curable paint onto a surface of a article; vaporizing the solvent in the UV curable paint thereby forming a film; and curing the film using ultra-violet radiation thus forming a polymer coating.

In still another embodiment, a coating structure includes a polymer film, a number of pigment particles and a number of nano silver particles dispersed therein, wherein the polymer film is represented by the following formula:

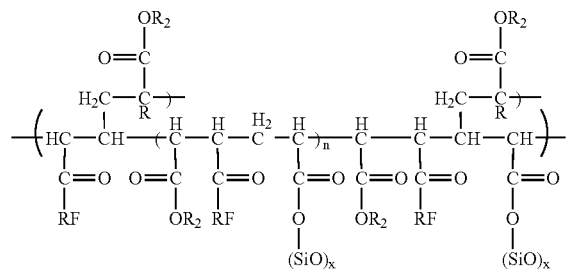

wherein R and $R_2$ are alkyl groups having 1 to 4 carbon atoms, x is in the range from 1 to 3, n is in the range from 5 to 23.

BRIEF DESCRIPTION OF THE DRAWINGS

Many aspects of the present invention can be better understood with reference to the following drawing. The components in the drawing are not necessarily drawn to scale, the emphasis instead being placed upon clearly illustrating the principles of the present invention.

DETAILED DESCRIPTION OF THE PREFERRED EMBODIMENTS

Figure 1:
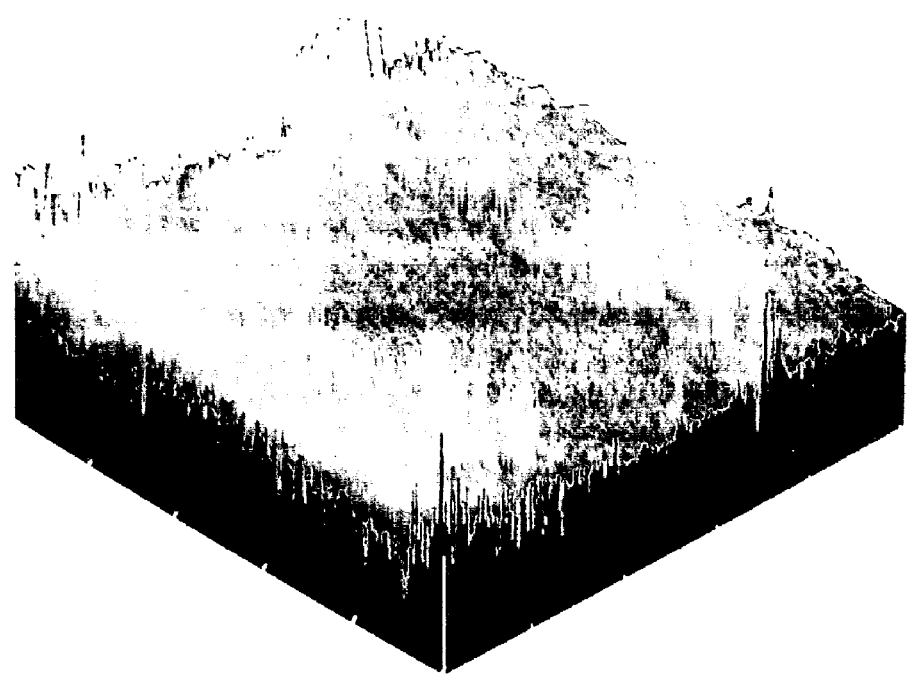
FIG. 1 is an atom force microscopy (AFM) image of a coating structure made from a UV curable paint composition in accordance with a preferred embodiment.

In accordance with a preferred embodiment, an ultra-violet (UV) curable paint composition includes a silicone modified aliphatic acrylated oligomer having fluorine substituted side chains in an amount by weight from 5% to 25%; an alkyl acrylate monomer in an amount by weight from 5% to 25%; a photoinitiator in an amount by weight from 0.1% to 5%; pigment particles in an amount by weight from 0.1% to 5%; a nano-silver solution in a amount by weight from 0.1% to 5%; with remainder being solvent.

The alkyl acrylated oligomer can be represented by the following formula:

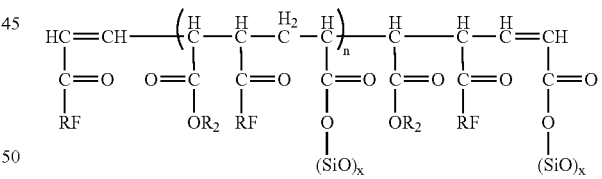

wherein "R", "$R_2$" are alkyl groups having 1 to 4 carbon atoms, x is in the range from 1 to 3, and n is in the range from 5 to 23, and one fluorine atom substitutes one of the hydrogen atoms in each of the "R" groups.

The alkyl acrylate monomer can be represented by the following formula:

wherein "R", "$R_2$" are alkyl groups having 1 to 4 carbon atoms.

Generally, the photoinitiator can be selected from the group consisting of: benzophenone; benzil dimethyl ketal; 1-hydroxycyclohexyl phenyl ketone; 2-methyl-1-[4-(methylthio)phenyl]-2-morpholino propan-1-one; the combination of 50% 1-hydroxy cyclohexyl phenyl ketone by mole and 50% benzophenone; 2,2-dimethoxy-1,2-diphenylethan-1-one by mole; the combination of 25% bis(2,6-dimethoxybenzoyl-2,4-, 4-trimethyl pentyl phosphine oxide by mole and 75% 2-hydroxy-2-methyl-1-phenyl-propan-1-one by mole; 2-hydroxy-2-methyl-1-phenyl-1-propanone; the combination of 50% 2,4,6-trimethylbenzoyldiphenyl-phosphine oxide by mole and 50% 2-hydroxy 2-methyl-1-phenyl-propan-1-one by mole; mixed triaryl sulfonium hexafluoroantimonate salts; mixed triaryl sulfonium hexafluorophosphate salts; and mixtures thereof.

Preferably, the pigment particles are nano powder made from carbon black ground by a high speed ball grinding machine, with a grain size of less than or equal to 137 nanometers.

The nano-silver solution can be made by dispersing nano-silver particles in a solvent such as toluene. Preferably, the diameter of the nano-silver is less than or equal to 137 nanometers. Preferably, the concentration of the nano-silver solution is 1400 ppm by weight.

The solvent of the present embodiment can be selected from the group consisting of methyl ethyl ketone (MEK), methyl isobutyl ketone (MIEK), and mixture of MEK and MIEK. Preferably, the solvent is mixture of MEK and MIEK with a volume ratio of 1:1.

Alternatively, the UV curable paint composition may further include an additive component selected from the group consisting of a UV absorber and a light stabilizer. Suitable UV absorbers include TINUVIN 328, TINUVIN 384, TINUVIN 900, TINUVIN 928, TINUVIN 1130, and TINUVIN 400, all of which are commercially available from Ciba-Geigy Corp., Tarrytown, N.Y. Suitable light stabilizers are Hindered Amine Light Stabilizers (HALS) such as TINUVIN 11 FD, TINUVIN 123, TINUVIN 144, and TINUVIN 292. These light stabilizers are also commercially available from Ciba-Geigy Corp., Tarrytown, N.Y.

In accordance with a preferred embodiment, a method for making the UV curable paint composition includes the following steps. First of all, a silicone modified aliphatic acrylated oligomer having fluorine substituted side chains in an amount by weight from 5% to 25%; an alkyl acrylate monomer in an amount by weight from 5% to 25%; a photoinitiator in an amount by weight from 0.1% to 5%; a pigment particles in an amount by weight from 0.1% to 5%; and a nano-silver solution in a amount by weight from 0.1% to 5% are poured into a reactor containing predetermined amounts of solvent, thus forming a mixture. Secondly, the mixture is stirred until it is homogenous, thereby forming a UV curable paint. It is preferable to stir the mixture using a stirring rod. When the solvent occupies a relatively large proportion of the total volume while the total volume of the mixture is not in itself too large, electromagnetic mixing or ultrasonic vibration mixing methods can also be used. The total amount of the mixture determines the time spent stirring, which can be in the range from several hours to more than one day.

In accordance with a preferred embodiment, a method for forming a coating with the UV curable paint composition according to aforementioned embodiments includes the steps of: coating the UV curable paint composition onto an article to form a film of paint, heating the film to a lower temperature, preferably from 60 to 80 degrees centigrade, for about 5 minutes, and irradiating the film with UV light to cure the film completely.

The coating method can be spraying, dip coating or spread coating. Different coating methods can give different appearances to the paint coating. The heating method can be practiced in an oven or with a hot-air drying method. The curing can be performed in a ultra-violet lithography machine and last for about one second. Preferably, the energy density of the UV light is 0.4 J/cm$^2$. The speed of the transmission belt of the ultra-violet lithography machine can be in the range from 7 to 15 feet/minutes. The photoinitiator will produce free radicals with high reactivity when it absorbs the ultra-violet radiation, the free radical will start the polymerization of the alkyl acrylate oligomer and the alkyl acrylate monomer so as to form a polymer which can be represented by the following formula:

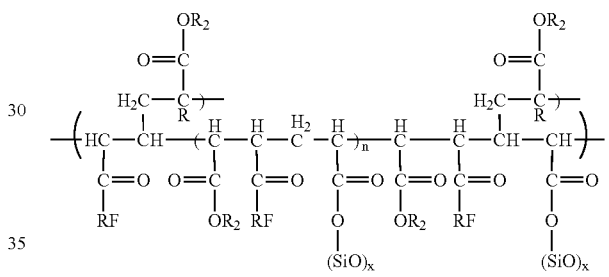

wherein "R", "R$_2$" are alkyl groups having 1 to 4 carbon atoms, x is in the range from 1 to 3, and n is in the range from 5 to 23, The fluorine substituted side chains have strong polarity compared with the aliphatic main chain; thus making them incompatible with the resin therein, therefore the fluorine substituted side chains will float outside of the resin during polymerization, thus forming a rough fluorine-containing surface with a lot of pin-like structures extruded therefrom. Since the fluorine-containing surface has lower interfacial tension than the polymer, it makes the coating more hydrophobic. It gets energetically too expensive to wet a rough hydrophobic surface, thus resulting in increased water-repellency. Energetically the best configuration for the drop is across top of the tips of the extrusions, not between.

A droplet on an inclined hydrophobic surface does not slide off; it rolls off. When the droplet rolls over a contamination, the particle is removed from the surface if the force of absorption of the particle is higher than the static friction force between the particle and the surface. Usually the force needed to remove a particle is very low due to the minimized contact area between the particle and the surface. As a result, the droplet cleans the surface of the coating by rolling off the surface. This self-cleaning property is similar to that of the lotus leaves, which is named "The Lotus Effect".

Referring to FIG. 1 showing an atomic force microscopy (AFM) image of a coating structure made from the following paint composition: a silicone modified aliphatic acrylated oligomer having fluorine substituted side chains in an amount by weight of 10%; an alkyl acrylate monomer in an amount by weight of 20%; a photoinitiator in an amount by weight of 0.5%; a pigment particles in an amount by weight of 0.5%; a nano-silver solution in a amount by weight from 0.5%; with remainder being solvent. As is shown, a lot of pin-like structures are extruded from the surface of the coating structure. The pin-like structures are not obviously observed when the pigment particle diameter is more than 191.4 nanometers, and are most prominent when the pigment particles diameter is less than or equal to 137 nanometers.

As a result of the inclusion of the nano silver particles, the coating structure in accordance with the preferred embodiment has antibacterial property. The mechanism is as described below: The nano silver particles will produce silver ions when in contact with a pathogen. Typically, bacterial pathogen is single cell microorganism and uses respiratory enzymes to breathe. The silver ions will penetrate the cell wall and react with the —SH group in the enzyme, so as to neutralize the enzyme activity. Finally the bacterial pathogen is killed by the silver ions.

Mechanical property tests on the coating structure obtained above gives the following results: the coating structure has a viscosity of up to 5B and a hardness up to 1H, where 5B is a measurement on the 3M peeling test, and 1H is a grade on the standard measurement of hardness for pencils. Furthermore, gloss degree test gets a result of above 90 degrees. Generally, when gloss degree is higher than 80 degrees, the coating can take on a mirror-like shine. Therefore, the paint coatings made by the thermosetting paint coating of the present invention reaches the standard of the art.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. An ultra-violet (UV) curable paint composition comprising:
    a silicone modified aliphatic acrylated oligomer having fluorine substituted side chains in an amount by weight from 5% to 25%;
    an alkyl acrylate monomer in an amount by weight from 5% to 25%;
    a photoinitiator in an amount by weight from 0.1% to 5%;
    a plurality of pigment particles in an amount by weight from 0.1% to 5%;
    a nano-silver solution in an amount by weight from 0.1% to 5%; with remainder being a solvent;
    wherein the silicone modified aliphatic acrylated oligomer is represented by the following formula:

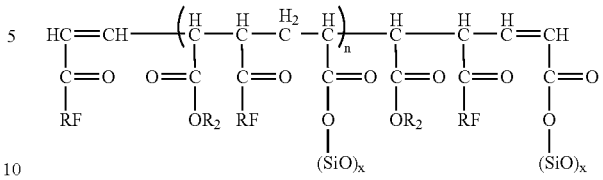

wherein R and $R_2$ are alkyl groups having 1 to 4 carbon atoms; x is in the range from 1 to 3; when x is in the range from 2 to 3, $(SiO)_x$ represents a linear chain of (SiO) groups; n is in the range from 5 to 23; and one fluorine atom substitutes one of the hydrogen atoms in each of the R groups.

2. The paint composition as claimed in claim 1, wherein the alkyl acrylate monomer is represented by the following formula:

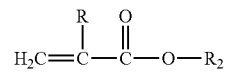

wherein R and $R_2$ are alkyl groups having 1 to 4 carbon atoms.

3. The paint composition as claimed in claim 1, wherein the photoinitiator is selected from the group consisting of: benzophenone, benzil dimethyl ketal, 1-hydroxycyclohexyl phenyl ketone, 2-methyl-1-[4-(methylthio)phenyl]-2-morpholino propan-1-one, the combination of 50% 1-hydroxy cyclohexyl phenyl ketone by mole and 50% benzophenone; 2,2-dimethoxy-1,2-diphenylethan-1-one by mole, a combination of 25% bis(2,6-dimethoxybenzoyl-2, 4, 4-trimethyl pentyl phosphine oxide by mole and 75% 2-hydroxy-2-methyl-1-phenyl-propan-1-one by mole; 2-hydroxy-2-methyl-1-phenyl-1-propanone, a combination of 50% 2,4,6-trimethylbenzoyldiphenyl-phosphine oxide by mole and 50% 2-hydroxy 2-methyl-1-phenyl-propan-1-one by mole; mixed triaryl sulfonium hexafluoroantimonate salts; mixed triaryl sulfonium hexafluorophosphate salts; and any combination thereof.

4. The paint composition as claimed in claim 1, wherein a size of each of the pigment particles is less than 137 nanometers.

5. The paint composition as claimed in claim 1, wherein the nano-silver solution comprises nano-silver particles, and sizes of the nano-silver particles are about 10 nanometers.

6. The paint composition as claimed in claim 1, wherein a concentration of the nano-silver solution is 1400 ppm by weight.

7. The paint composition as claimed in claim 1, wherein the solvent is selected from the group consisting of methyl ethyl ketone (MEK), methyl isobutyl ketone (MIEK), and a mixture of MEK and MIEK.

8. A method for using an ultra-violet (UV) curable paint, the method comprising the steps of:
    providing a UV curable paint composition as claimed in claim 1;

applying the UV curable paint composition onto a surface of the article;

vaporizing the solvent in the UV curable paint to form a film on the surface of the article; and curing the film using ultra-violet radiation thereby forming a coating on the article.

9. The method as claimed in claim 8, wherein the UV curable paint is applied on the surface of the article by spraying, dip coating or brush coating.

10. The method as claimed in claim 8, wherein the solvent is vaporized by infrared radiation or hot air.

11. The method as claimed in claim 8, wherein the film is cured at a temperature in the range from 60° C. to 80° C.

12. The method as claimed in claim 8, wherein the energy intensity of the ultra-violet radiation is about 0.4 J/cm².

13. A coating structure comprising
a polymer film;
a plurality of pigment particles; and
a plurality of nano-sized silver particles dispersed therein; wherein the polymer film is represented by the following formula:

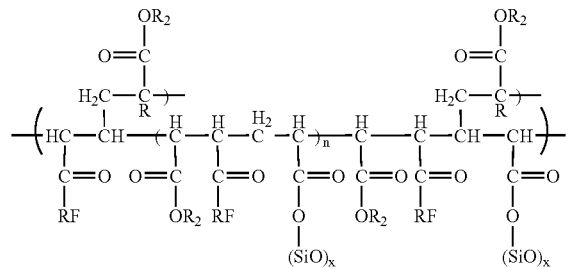

wherein R and $R_2$ are alkyl groups having 1 to 4 carbon atoms; x is in the range from 1 to 3; when x is in the range from 2 to 3, $(SiO)_x$ represents a linear chain of (SiO) groups; n is in the range from 5 to 23; and one fluorine atom substitutes one of the hydrogen atoms in each of the R groups.

14. The coating structure as claimed in claim 13, wherein the pigment particles each have a size of less than 137 nanometers.

* * * * *